United States Patent [19]

Kim

[11] Patent Number: 5,099,370
[45] Date of Patent: Mar. 24, 1992

[54] LOCKING DEVICE OF MIDDLE POLE IN A VCR COMBINED WITH CAMERA

[75] Inventor: Jong H. Kim, Seoul, Rep. of Korea
[73] Assignee: Goldstar Co., Ltd., Seoul, Rep. of Korea
[21] Appl. No.: 486,402
[22] Filed: Feb. 28, 1990
[30] Foreign Application Priority Data
  Feb. 28, 1989 [KR] Rep. of Korea ............... 2455/1989
[51] Int. Cl.⁵ .............................................. G11B 5/008
[52] U.S. Cl. ........................................ 360/85; 360/95
[58] Field of Search ................................. 360/95, 85
[56] References Cited
U.S. PATENT DOCUMENTS
  4,908,723  3/1990  Ohyama ........................... 360/95 X Primary Examiner—A. J. Heinz
Attorney, Agent, or Firm—Birch, Stewart, Kolasch & Birch

[57] ABSTRACT

A middle pole locking device of a camcorder utilizing a loading ring, which includes a locker having upper and lower locking grooves for preventing the fluctuation of a middle pole by supporting top and bottom ends of the middle pole so that the top and the bottom ends of middle pole are respectively locked to the upper and lower locking grooves of the locker at the time of loading operation being finished, whereby the device is simple in construction, small in space occupation, and prevents the middle pole from vibrating so that the travelling tape can be effectively stable.

1 Claim, 3 Drawing Sheets

FIG. 3
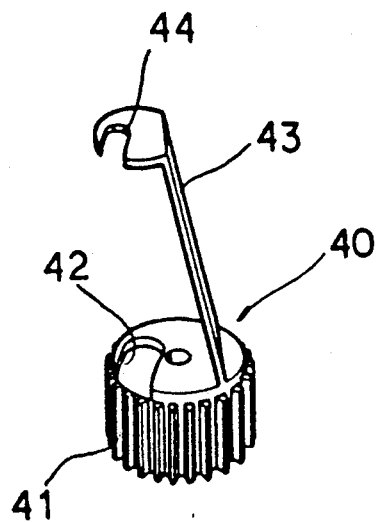
FIG. 4A  FIG. 4B
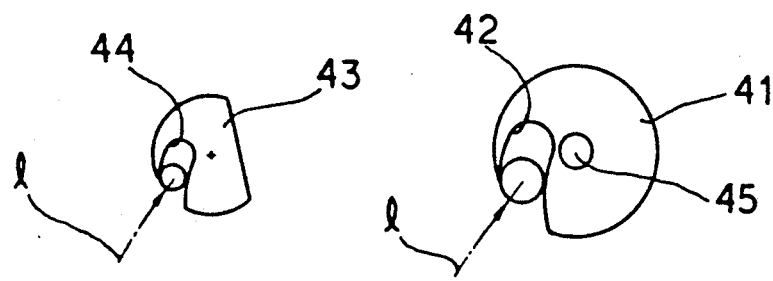
FIG. 5A  FIG. 5B
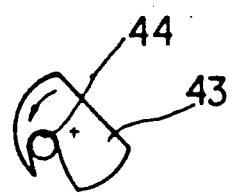
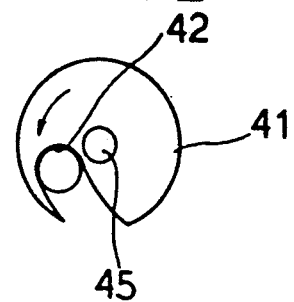

1

LOCKING DEVICE OF MIDDLE POLE IN A VCR COMBINED WITH CAMERA

BACKGROUND OF THE INVENTION

1. Field of the Invention

The present invention relates to, in a VCR combined with camera (hereinafter "camcorder") utilizing a loading ring to a locking device of a middle pole for drawing out the tape from a tape cassette so as to form a tape travelling path advancing from the stop mode to the tape loading mode and more particularly, to a middle pole locking device for a camcorder utilizing a loading ring for simplifying the structure, reducing the occupying space, and preventing the fine vibration of middle pole from minimizing so that the travelling of tape is effectively stable.

2. Description of the Prior Art

Several types of devices for preventing the fine vibration of middle pole from minimizing in a camcorder utilizing a loading ring are well known in the art. A conventional device of such devices is illustrated in FIGS. 1A and 1B. As shown in FIGS. 1A and 1B, the conventional device includes a bracket 1 of a plate fixed at one side of a main base (not shown) at a predetermined height, a cam gear 3 having a cam groove 3a at the lower surface thereof, a guide surface 3b in smaller diameter and a protruding guide surface 3c in larger diameter at the upper surface thereof, the cam gear 3 being rotatably mounted on a pivot pin 2 fixed at the side of the bracket I, a gear lever 6 provided with a guide pin 5 to be inserted into the cam groove 3a of the cam gear 3 at the top end thereof and a gear segment 6a in a predetermined circular arc at the other end thereof and a pressing lever 8 and a leaf spring 9 connected with each other by means of a tensional coil spring 7, the gear lever 6 being rotatably mounted on a hinge pin 4 fixed on the upper surface of the bracket 1, a middle arm assembly 11 provided, at one end thereof, with a gear 11a meshed with the gear segment 6a of the gear lever 6 and a middle pole 12 fixed at a middle arm 11a thereof, the middle arm assembly 11 being pivotally mounted on a hinge pivot 13 fixed on the bracket 1, and a guide plate 14 having a hooking groove 14a for supporting the top end of middle pole 12 at a predetermined height being mounted at the upper side of the bracket 1. Also, the device is provided with a guide surface 1a for guiding the bottom end portion of the middle pole 12 and a loading ring 15.

As shown in FIG. 1A, when the cam gear 3 is turned counterclockwise at a predetermined angle by the driving force of a loading motor at a state before loading, the gear lever 6, since the guide pin 5 is inserted into the cam groove 3a of cam gear 3, is turned counterclockwise around the hinge pin 4. Therefore, the middle arm assembly 11 having the gear means 11a meshed with gear segment 6a of the gear lever 6 is turned clockwise around the hinge pivot 13.

Thus, when reaching the time point that the loading operation of tape finishes, the top and the bottom ends of the middle pole 12 are contacted simultaneously to the guide surface 1a of the bracket 1 and the hooking groove 14a of the guide plate 14. When the cam gear 3 is further turned in a predetermined angle as shown in FIG. 1B, the leaf spring 9 is guided on the protruding guide surface 3c of the cam gear 3 so that the leaf spring 9 is turned clockwise around the hinge pin 4. Accordingly, the pressing lever 8 connected by the tensional coil spring 7 with the leaf spring 9 is turned clockwise around the hinge pin 4 by the tensile strength of the tensional coil spring 7 and makes the middle pole 12 to be press-contacted. At this moment, the tensional coil spring 10 for connecting the gear lever 6 with the leaf spring 9 is maintained in a tensioned state by the turning action of the leaf spring 9.

On the other hand, in a state that the unloading is finished as shown in FIG. 1B, when the cam gear 3 is turned clockwise and the leaf spring 9 is released from the protruding guide surface 3c of the cam gear 3, the leaf spring 9 is turned counterclockwise around the hinge pin 4 by the resilient returning force of the tensional coil spring 10 for connecting the gear lever 6 with the leaf spring 9. Accordingly, the pressure contacting force of the tensional coil spring 7 of the pressing lever 8 is released, the cam gear 3 is kept turned clockwise. Accordingly, the gear lever 6 is turned clockwise and the middle arm assembly 11 is turned counterclockwise around the hinge 13, and consequently becoming the unloading state as shown in FIG. 1A.

However, in the middle pole locking device of the conventional camcorder as described in above, there are a number of problems such as for example, the structure is complicated because of various parts such as the cam gear 3 and gear lever 6 of complicated form and the occupying space is larger even in small deck because of the bracket 1 provided at the upper side of a main base with the predetermined distance and also, a separate guide plate 14 at the upper side of the bracket 1 with predetermined distance. Furthermore, there are a number of problems such as, for example, the middle pole 12 is press-contacted by the resilient force of the tensional coil spring 7 so that the traveling tape is vibrated by a slight movement of the middle pole 12 and also, the slant angle and the azimuth angle are distorted so that the travelling operation of the tape becomes unstable. Therefore, the stable picture screen cannot be obtained.

SUMMARY OF THE INVENTION

Accordingly, it is an object of the present invention to provide an improved middle pole locking device for solving the above described difficulties and problems encountered in the conventional devices.

Another object of the present invention is to provide a locking device of a middle pole in a camcorder, which includes a locker having upper and lower locking grooves for preventing the fluctuation of the middle pole by supporting the top and the bottom ends of the middle pole whereby, the tape loading operation is finished, the top and the bottom ends of the middle pole are locked by the upper and the bottom locking grooves of the locker so that the slight vibration of the middle pole is minimized, thereby the stable travelling of the tape can be obtained.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a middle pole locking device of a camcorder utilizing a loading ring, which includes a locker having upper and lower locking grooves for preventing the fluctuation of a middle pole by supporting the top and the bottom ends of the middle pole so that the top and the bottom ends of middle pole so that the top and bottom ends of middle pole are respectively locked to the upper and lower locking grooves of the locker at the time of loading operation being finished, whereby the device is simple in construction, small in space occupation, and prevents the middle pole from vibrating so that the travelling tape can be effectively stable.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a perspective view of a locker of the locking device according to the present invention;

FIGS. 4A and 4B are plan views illustrating the operation of the locking device according to the present invention showing the state during loading; and FIGS. 5A and 5B are plan views illustrating the operation of the locking device according to the present invention showing the state that the loading is finished.

DESCRIPTION OF THE PREFERRED EMBODIMENTS

Figure 1A:
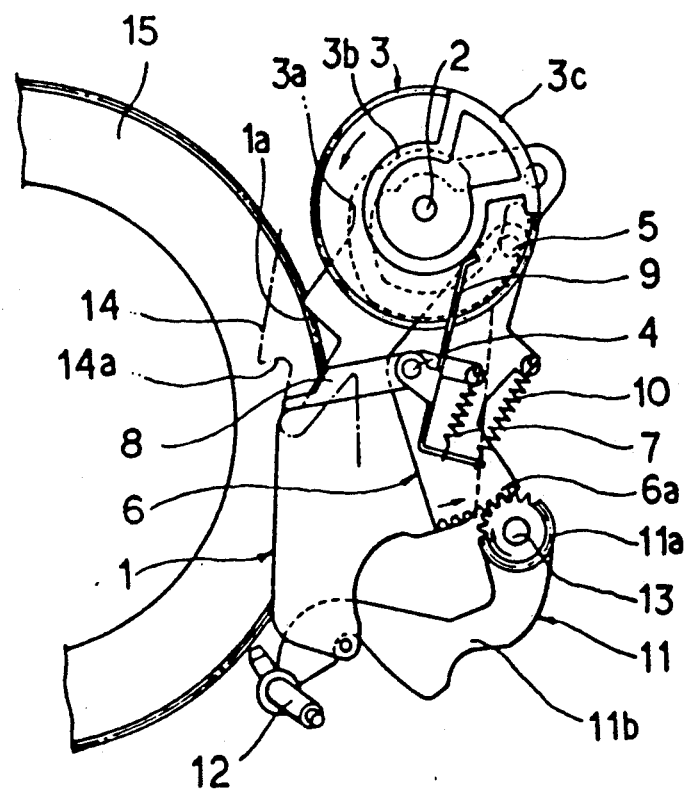
FIG. 1A is a plan view of the conventional device showing a state before loading.
Figure 1B:
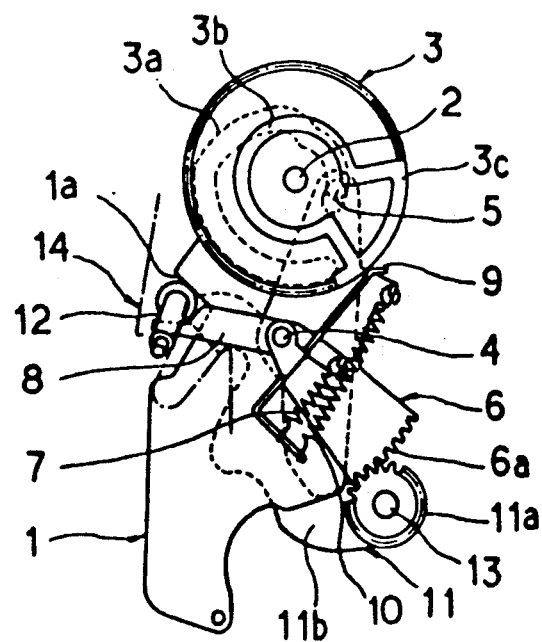
FIG. 1B is a plan view of the conventional device showing a state that the, loading is finished.

Referring now in detail to the drawings for the purpose of illustrating preferred embodiments of the present invention, the locking device for middle pole of the present invention as shown in FIGS. 2A to 2C and 3, which comprises a loading ring 20 rotatably installed on the middle portion of main base, and at a side of the loading ring 20, a middle arm assembly 30 provided with a gear means 31 and a middle pole 33 rotatably mounted around the hinge pivot 34, a circular arc shaped guide groove 22 having a concentric circular section 21 disposed on the loading ring 20, and a locker 40 rotatably mounted around a hinge pivot 45 wherein a gear means 41 is provided at the lower portion thereof and an arcuate lower locking groove 42 to be locked with the bottom end of the middle pole 33 is provided at the top surface of the gear means 41. The locker 40 is also provided with an upper locking groove 44 for locking with the top end of middle pole 33 at the top surface of a supporting rod 43 standing on the top surface of the gear member 41 at a predetermined inclined angle.

An operational plate 50 is slidably mounted at the lower side of the loading ring 20 by a pair of guide slots 55 and 55' through a pair of guide pins 51 and 51' inserted into the guide slots 55 and 55' and fixed on the base plate. The operational plate 20 is provided with a movable guide pin 52 inserted in the arcuate guide slot 22 of the loading ring 20. The operational plate 50 is also, provided with a rearward rack 53 to be meshed with the gear member 41 of the locker 40 at the rearward portion thereof and a forward rack 54 to be meshed with the gear means 31 of the middle arm assembly 30 at the forward edge portion thereof. The operational plate 50 is resiliently forced forward the middle arm assembly 30 by means of a tensional coil spring 57. One end of the tensional coil spring 57 is fixed to a fixing protrusion 56 provided at the edge of the operational plate 50.

Figure 2A:
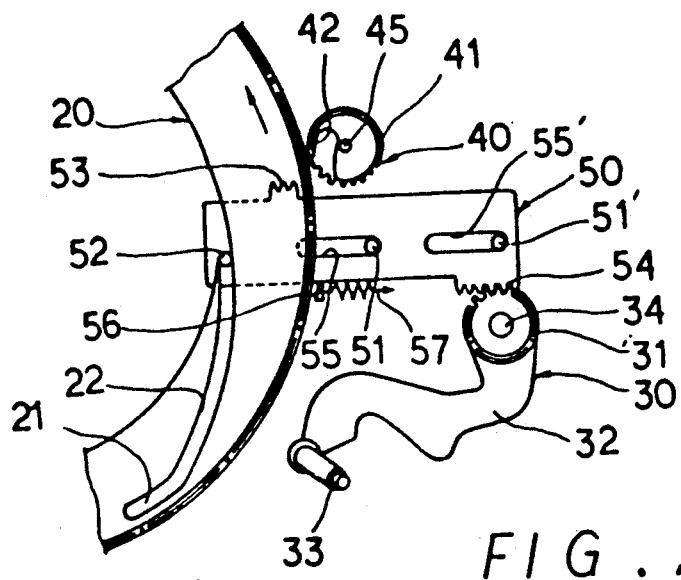
FIG. 2A is a plan view of a locking device of a preferred embodiment according to the present invention showing a state of initial loading.

The locking device of the present invention operates as follows:

FIG. 2A shows an initial state of loading operation of the tape. When the loading ring 20 is turned counterclockwise by the loading motor in this state, the operational plate 50 is moved toward right in the drawings by the movable guide pin 52 inserted in the guide slot 22 of the loading ring 20. Accordingly, the middle arm assembly 30 having the gear member 31 to be meshed with the forward rack 54 of the operational plate 50 is turned clockwise around the hinge pivot 34.

Figure 2B:
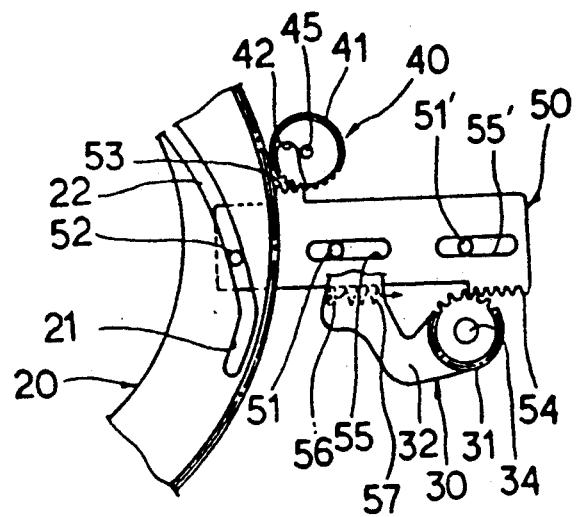
FIG. 2B is a plan view of a locking device of a preferred embodiment according to the present invention showing a state during loading.

Therefore, as shown in FIGS. 4A and 4B, when the bottom end of the middle pole 33 of the middle arm assembly 30 is entered up to the inlet of the lower locking groove 44 of the locker 40, and at the same time, the top end of the middle pole 33 is entered up to the inlet of the upper locking grove 44 of the supporting rod 43 formed at the locker 40 as shown in FIG. 2B, the meshing of the forward rack 54 of the operational plate 50 with the gear member 31 of the middle arm assembly 30 becomes almost finished and, at the same time, the rearward rack 53 of the operational plate 50 is meshed with the gear means 41 of the locker 40.

Figure 2C:
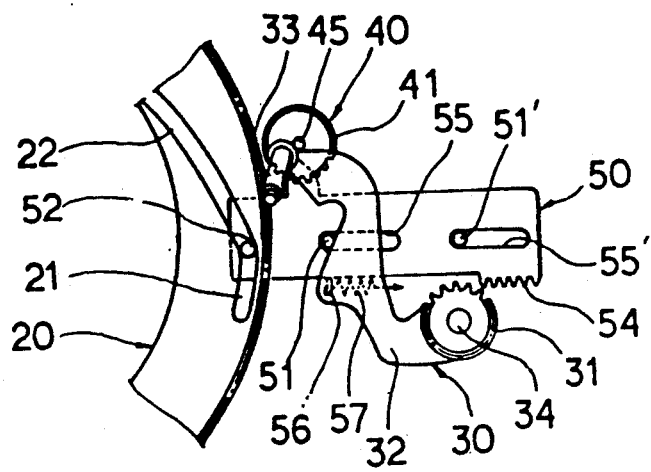
FIG. 2C is a plan view of a locking device of a preferred embodiment according to the present invention showing a state that the loading is finished.

When the loading ring 20 is further turned counterclockwise as shown in FIG. 2C, the locker 40 is turned counterclockwise around the hinge pivot 45 and therefore as shown in FIGS. 4A and 4B, the top and the bottom ends of the middle pole 33 located at the inlet of the upper and the lower locking grooves 44 and 42 of the locker 40 become locked to the innermost end of the upper and lower locking grooves 44 and 42 as shown in FIGS. 5A and 5B upon turning of the locker 40.

That is, as shown in FIGS. 4A and 4B, the top and the bottom ends of the middle pole 33 which are executing a circular movement by the locus 1 become turned as like as the upper and lower locking grooves 44 and 42 surrounding the top and the bottom ends of the middle pole 33 by the turning of the locker 40 in a state of being located at the inlet of the upper locking groove 44 and the lower locking groove 42. Therefore, as shown in FIGS. 5A and 5B, the top and the bottom ends of the middle pole 33 is press-contacted to the innermost end edge of the upper and the lower locking grooves 44 and 42 of the locker 40. Accordingly, the turning locus 1 of the middle pole 33 is interrupted and consequently even if the tension of tape is applied, the middle pole 33 is maintained in a firmly fixed condition without the slight fluctuation.

Furthermore, since the movable guide pin 52 of the operational plate 50 becomes located at the concentric circular portion 21 formed on the guide groove 22 of the loading ring 20 from this time, the operational plate 50 is stopped until the loading ring 20 is turned to the playback mode.

On the other hand, it is advanced in reverse of aforementioned operation at the time of unloading the tape since the loading ring is turned clockwise, and the tensional coil spring 57 for resiliently supporting the operational plate 50 serves for guiding the movable guide pin 52 of the operational plate 50 into the guide groove 21 of the loading ring 20 at the initial time of loading the tape by pulling the operational plate 50 constantly toward the right in the drawings.

The middle pole locking device utilizing the loading ring 20 according to the present invention is made to receive the driving source of the middle arm assembly 30 directly from the loading ring 20 without using the conventional cam gear, at the same time, the constitution is greatly simplified by locking completely the middle pole 33 by using the locker 40 coupled with the loading ring 20, and the occupying space of small deck can be reduced by excluding the use of the separate bracket and the guide plate. Also, the tape can be travelled more stably by preventing the slight vibration in the state that the middle pole is locked. Therefore, there is effect that a picture screen of more excellent quality can be obtained.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A locking device for a moving slant post in a VCR combined with a camera, which comprises:
   a loading ring having a guide slot with a concentric arcuate portion, said loading ring being provided with a first gear member disposed at one side thereof;
   a middle arm rotatably mounted to said first gear member at one end and tightly fixed to said moving slant post at the other end thereof;
   a locker provided with a second gear member rotatably mounted to the lower portion thereof, said second gear member having a lower locking groove on the upper surface thereof for engaging with the lower edge of said moving slant post and a supporting rod disposed at a predetermined inclined angle on the upper surface thereof wherein the upper portion of said supporting rod contains an upper locking groove for engaging with the upper end of the moving slant post; and
   an operational plate provided with a guide pin which is inserted and guided in a guide groove of said loading ring and resiliently supported by a tension spring, a rearward rack gear which is disposed in a gearing relationship with said second gear member of said locker at the rear edge portion thereof, and a forward rack gear which is disposed in a gearing relationship with said first gear member of said middle arm at the front edge thereof.

* * * * *